(12) United States Patent
Kato et al.

(10) Patent No.: US 9,062,132 B2
(45) Date of Patent: Jun. 23, 2015

(54) DISPERSION STABILIZER FOR SUSPENSION POLYMERIZATION

(75) Inventors: Masaki Kato, Kurashiki (JP); Masato Nakamae, Kurashiki (JP)

(73) Assignee: KURARAY CO., LTD., Kurashiki-shi (JP)

( * ) Notice: Subject to any disclaimer, the term of this patent is extended or adjusted under 35 U.S.C. 154(b) by 833 days.

(21) Appl. No.: 12/595,047

(22) PCT Filed: Apr. 7, 2008

(86) PCT No.: PCT/JP2008/056901
§ 371 (c)(1),
(2), (4) Date: Oct. 8, 2009

(87) PCT Pub. No.: WO2008/129936
PCT Pub. Date: Oct. 30, 2008

(65) Prior Publication Data
US 2010/0041828 A1    Feb. 18, 2010

(30) Foreign Application Priority Data

Apr. 16, 2007  (JP) ................................ 2007-106805
Apr. 16, 2007  (JP) ................................ 2007-106806

(51) Int. Cl.
| C08L 29/04 | (2006.01) |
| C08F 2/20 | (2006.01) |
| C08F 8/14 | (2006.01) |

(52) U.S. Cl.
CPC ... *C08F 2/20* (2013.01); *C08F 8/14* (2013.01); *C08L 29/04* (2013.01); *C08L 2205/02* (2013.01)

(58) Field of Classification Search
CPC .............. C08F 2/20; C08F 8/14; C08F 16/06; C08F 29/04
USPC ............... 524/503; 525/57; 526/202
See application file for complete search history.

(56) References Cited

U.S. PATENT DOCUMENTS

| 2,705,226 | A | * | 3/1955 | Bond ............................ 526/202 |
| 3,548,408 | A | * | 12/1970 | Worrall ........................ 526/345 |
| 4,258,163 | A | | 3/1981 | Mariasi et al. |
| 4,345,056 | A | | 8/1982 | Thyret et al. |
| 4,388,442 | A | * | 6/1983 | Taniguchi et al. .............. 525/60 |
| 5,349,008 | A | | 9/1994 | Takada et al. |
| 5,629,378 | A | | 5/1997 | Takada |
| 5,714,540 | A | * | 2/1998 | Tanaka et al. .............. 525/54.24 |
| 5,780,547 | A | * | 7/1998 | Saeki et al. ...................... 525/61 |
| 5,977,273 | A | * | 11/1999 | Saeki et al. .................... 526/202 |
| 6,635,709 | B2 | | 10/2003 | Kato et al. |
| 6,806,305 | B2 | | 10/2004 | Kato et al. |
| 7,070,731 | B2 | | 7/2006 | Kato et al. |
| 7,439,311 | B2 | | 10/2008 | Kato et al. |
| 2005/0148736 | A1 | | 7/2005 | Kato et al. |
| 2005/0197476 | A1 | * | 9/2005 | Ooura et al. .................. 526/344 |
| 2006/0180956 | A1 | | 8/2006 | Kato et al. |
| 2009/0111940 | A1 | | 4/2009 | Kato et al. |

FOREIGN PATENT DOCUMENTS

| JP | 52 110797 | 9/1977 |
| JP | 53 6392 | 1/1978 |
| JP | 56 167745 | 12/1981 |
| JP | 4 154810 | 5/1992 |
| JP | 5 345805 | 12/1993 |
| JP | 7 62006 | 3/1995 |
| JP | 7 173219 | 7/1995 |
| JP | 8 109206 | 4/1996 |
| JP | 8 259609 | 10/1996 |
| JP | 9 77807 | 3/1997 |
| JP | 9 100301 | 4/1997 |
| JP | 9 183805 | 7/1997 |
| JP | 10 152508 | 6/1998 |
| JP | 10 168128 | 6/1998 |
| JP | 10 259213 | 9/1998 |
| JP | 2000 239317 | 9/2000 |
| JP | 2002 37807 | 2/2002 |
| JP | 2007 63369 | 3/2007 |
| WO | 91 15518 | 10/1991 |

OTHER PUBLICATIONS

U.S. Appl. No. 12/526,131, filed Aug. 6, 2009, Nii, et al.
U.S. Appl. No. 13/123,386, filed Apr. 8, 2011, Kato, et al.
U.S. Appl. No. 12/999,020, filed Dec. 14, 2010, Kato, et al.
U.S. Appl. No. 12/999,147, filed Dec. 15, 2010, Kato, et al.
U.S. Appl. No. 12/999,346, filed Dec. 16, 2010, Kato, et al.
U.S. Appl. No. 12/999,167, filed Dec. 15, 2010, Kato, et al.

* cited by examiner

*Primary Examiner* — David W Wu
*Assistant Examiner* — Marie Reddick
(74) *Attorney, Agent, or Firm* — Oblon, McClelland, Maier & Neustadt, L.L.P.

(57) ABSTRACT

The present invention provides a dispersion stabilizer having an excellent polymerization stability. When used for suspension polymerization of vinyl compounds even in small amounts, the dispersion stabilizer according to the present invention attains the effects that: with respect to vinyl polymer particles to be obtained, the plasticizer absorptivity is high, leading to easy processing; residual monomer components such as a vinyl compound can be removed easily; the number of coarse particles is small; the obtained particles are as uniform as possible in particle size so that formation of fish-eyes can be prevented. The present invention provides a dispersion stabilizer for suspension polymerization including a polyvinyl alcohol polymer (A) having a saponification degree of 60 mol % or more and a polymerization degree of 200 or more, and a polyvinyl alcohol polymer (C) obtained by esterifying a polyvinyl alcohol polymer (B) having a saponification degree of less than 60 mol % with a carboxylic acid compound.

18 Claims, No Drawings

DISPERSION STABILIZER FOR SUSPENSION POLYMERIZATION

TECHNICAL FIELD

The present invention relates to a dispersion stabilizer for suspension polymerization. More particularly, the present invention relates to a dispersion stabilizer for suspension polymerization of a vinyl compound.

BACKGROUND ART

Conventionally, it is known that partially saponified polyvinyl alcohol polymers are used as a dispersion stabilizer in suspension polymerization of vinyl compounds represented by vinyl chloride.

Dispersion stabilizers for suspension polymerization of vinyl compounds are required to satisfy ideally all the following required performance [1] to [4], even if used in small amounts. The necessary performance desired is that: with respect to the vinyl polymer particles to be obtained, [1] plasticizer absorptivity is high so that processing is easy, [2] removal of the residual monomer components such as a vinyl compound is easy, [3] the number of coarse particles is small, [4] particle size thereof is as uniform as possible so that formation of fish-eyes and the like can be prevented.

In response to these requirements, for example, a method is proposed in which polyvinyl alcohol having a low polymerization degree and a low saponification degree is used as a dispersing aid in combination with the dispersion stabilizer for suspension polymerization of vinyl compounds.

JP 4(1992)-154810 A describes use of an aqueous dispersion in which the dispersoid is a vinyl ester polymer that includes an amino group, an ammonium group, a carboxyl group or a sulfonic acid group in its side chain, and that has a saponification degree of 70 mol % or less.

JP 10(1998)-259213 A describes use of an aqueous solution of a partially saponified vinyl ester resin that includes an oxyalkylene group, a carboxyl group, a sulfonic acid group, an amino group or an ammonium group, and that has a saponification degree of 70 mol % or less.

JP 53(1978)-6392 A discloses a process of suspension-polymerizing vinyl chloride using a nonionic emulsifier and partially saponified polyvinyl acetate having a saponification degree of 40 to 55 mol % and a 4% solution viscosity in a mixed solvent of isopropanol and water (isopropanol:water=1:1) of 5 to 15 mPa s (which is equivalent to an average polymerization degree of 74 to 80).

JP 56(1981)-167745 A discloses an aqueous dispersion in which the dispersion stabilizer is polyvinyl alcohol having a saponification degree of 65 mol % or more and an average polymerization degree of 100 to 3000, and the dispersoid is polyvinyl ester having a saponification degree of 20 to 65 mol % and an average polymerization degree of 1000 or less. According to the description, the aqueous dispersion can be used as a dispersion stabilizing aid for suspension polymerization of vinyl chloride.

WO 91/15518 A discloses an aqueous dispersion in which a terminal ion-modified polyvinyl ester polymer having a saponification degree of 60 mol % or less and an average polymerization degree of 50 to 3000 is used as a dispersing aid, and use of the aqueous dispersion as a dispersion stabilizer for suspension polymerization of vinyl monomers, such as vinyl chloride.

JP 52(1977)-110797 A discloses a dispersing aid for suspension polymerization of vinyl chloride composed of partially saponified polyvinyl alcohol with a block structure, having a saponification degree of 30 to 65 mol % and a polymerization degree of 60 to 6000.

JP 5(1993)-345805 A discloses a dispersing aid for suspension polymerization of a vinyl compound composed of an aqueous dispersion in which the dispersoid is a polyvinyl ester polymer having a saponification degree of 60 mol % or less, an average polymerization degree of 4000 or more, and an average particle size of 100 μm or less.

JP 7(1995)-62006 A discloses a process for producing a vinyl chloride polymer in which partially saponified polyvinyl alcohol having a saponification degree of 70 to 85 mol % and an average polymerization degree of 1500 to 3000 is used as a dispersion stabilizer, while partially saponified polyvinyl alcohol having a saponification degree of 20 to 55 mol % and an average polymerization degree of 100 to 600 is used as a dispersing aid, and reaction is started after dissolving a part or all of the dispersing aid in a vinyl chloride monomer.

JP 9(1997)-77807 A discloses a dispersing aid for suspension polymerization of a vinyl compound composed of a vinyl ester polymer that includes a hydroxy alkyl group in its side chain, and that has a saponification degree of less than 65 mol %.

JP 10(1998)-168128 A discloses a polyvinyl alcohol polymer that is useful, for example, as a dispersing aid for suspension polymerization of a vinyl compound, that includes an ionic group at its one terminal, and that has a saponification degree of 10 to 85 mol % and a polymerization degree of 50 to 3000.

JP 9(1997)-100301 A discloses a dispersing aid for suspension polymerization of a vinyl compound composed of an aqueous solution containing 10 to 50 wt % of a vinyl ester resin with a content of 0.5 to 10 mol % of an oxyalkylene group and a saponification degree of 70 mol % or less.

JP 10(1998)-152508 A discloses a dispersing aid for suspension polymerization of a vinyl compound composed of a vinyl ester polymer that contains 10 mol % or less of an ionic group in its side chain or at its terminal, and that has a pH of 4.0 to 7.0 in a state of an aqueous dispersion and a saponification degree of 60 mol % or less.

JP 9(1997)-183805 A discloses a dispersing aid for suspension polymerization of a vinyl compound composed of a polyvinyl ester polymer that includes 0.01 to 0.3 mol % of a sulfonic acid group and 0.05 to 1.0 mol % of a carboxyl group in its side chain or at its terminal with the mole ratio of the two being in the range from 0.1 to 0.5, and that has a saponification degree of 60 mol % or less.

JP 8(1996)-109206 A discloses a dispersion stabilizer for suspension polymerization of a vinyl compound composed of a polyvinyl alcohol polymer (A) that includes a mercapto group at its terminal and that has a saponification degree of 60 mol % or more, and a polyvinyl ester polymer (B) that has a saponification degree of less than 60 mol %, with the weight ratio of the component (A) to the component (B) expressed as (A)/(B) being in the range from 40/60 to 95/5.

JP 8(1996)-259609 A discloses a dispersion stabilizer for suspension polymerization of a vinyl compound composed by mixing modified polyvinyl alcohol (A) that includes 0.01 to 10 mol % of one selected from a sulfonic acid group, an amino group, an ammonium group, a carboxyl group and a cationic group, and that has a content of ethylene units of 1 to 24 mol % and a saponification degree of more than 80 mol %, and a polyvinyl alcohol polymer (B) having a saponification degree of 60 to 95 mol % and a polymerization degree of 600 or more, with a mixing ratio of (A) component/(B) component being in the range from 1/9 to 8/2 by weight ratio.

JP 2002-37807 A discloses a dispersion stabilizer for suspension polymerization of a vinyl compound composed of a polyvinyl alcohol polymer (A) having a saponification degree of 60 mol % or more and a polymerization degree of 600 or more, and a modified polyvinyl alcohol polymer (B) having a content of ethylene units of 0.5 to 20 mol %, a saponification degree of 20 to 60 mol % and a polymerization degree of 100 to 600.

However, even in the case of using dispersion stabilizing aids for suspension polymerization described in these patent documents, the required performance [1] to [4] has not been satisfied thoroughly enough.

DISCLOSURE OF THE INVENTION

It is an object of the present invention to provide a dispersion stabilizer for suspension polymerization that satisfies all the required performance [1] to [4] and that has excellent polymerization stability, in suspension polymerization of vinyl compounds, such as vinyl chloride.

As a result of diligent studies, the inventors found that a dispersion stabilizer for suspension polymerization containing polyvinyl alcohol polymer (A) having a saponification degree of 60 mol % or more and a polymerization degree of 200 or more, and a polyvinyl alcohol polymer (C) obtained by esterifying a polyvinyl alcohol polymer (B) having a saponification degree of less than 60 mol % with a carboxylic acid compound can solve the above described problem, so that the present invention has been accomplished.

When used in suspension polymerization of a vinyl compound, even in a small amount, the dispersion stabilizer for suspension polymerization according to the present invention allows excellent effects to be achieved such that vinyl polymer particles to be obtained have a high plasticizer absorptivity, thereby allowing easy processing, residual monomer components such as a vinyl compound can be removed easily, and since the number of coarse particles to be formed is small due to high polymerization stability, particles with uniform particle size can be obtained as well as formation of fish-eyes or the like can be prevented.

BEST MODE FOR CARRYING OUT THE INVENTION

A polyvinyl alcohol polymer (A) to be used in the present invention (hereinafter, a polyvinyl alcohol polymer may be abbreviated as a PVA polymer) has a saponification degree of at least 60 mol %, preferably 65 to 95 mol %, more preferably 70 to 90 mol %. If the saponification degree is less than 60 mol %, the water-solubility of the PVA polymer decreases, so that handleability thereof becomes poor. Further, the polymerization degree of the PVA polymer (A) is at least 200, preferably at least 500, more preferably 550 to 8000, further preferably 600 to 3500. If the polymerization degree of the PVA polymer is less than 500, the polymerization stability in suspension polymerization of a vinyl compound decreases. The PVA polymer (A) may be used independently, or two or more kinds having a different property may be used in combination. The polymerization degree and the saponification degree of the PVA polymer can be determined, for example, according to JIS K6726.

A PVA polymer (C) to be used in the present invention has a structure obtained by esterifying a PVA polymer (B) having a saponification degree of less than 60 mol % with a carboxylic acid compound. Conventionally, polyvinyl alcohol having a low saponification degree has been used as a dispersing aid for suspension polymerization. However, in the present invention, a PVA polymer having a low saponification degree is esterified with a carboxylic acid compound, and thereby a new vinyl ester unit is introduced into the PVA polymer as a monomer unit. Thus the new vinyl ester unit allows the performance of the PVA polymer to be enhanced, and allows the stability of the vinyl chloride monomers in a dispersed state to be improved, compared to the case of using conventional polyvinyl alcohol that has a low saponification degree. Particularly, it is possible to introduce an unsaturated double bond and a functional group such as a carboxyl group into this new vinyl ester unit, thereby allowing an advantageous effect to be obtained that the stability of vinyl chloride monomers in a dispersed state is improved.

The carboxylic acid compound to be used is not particularly limited as long as the effects of the present invention are not impaired. However, the carboxylic acid compound should be selected so that a vinyl ester unit that is different from the vinyl ester unit included in the partial saponified PVA polymer (B) as a monomer unit is introduced. For example, if the vinyl ester unit included in the PVA polymer (B) is a vinyl acetate unit, a carboxylic acid compound other than acetic acid, particularly, having three carbon atoms should be selected as the carboxylic acid compound.

Carboxylic acid compounds can be classified roughly into a carboxylic acid having an unsaturated double bond, an aliphatic carboxylic acid containing no olefinically unsaturated bond in the molecule, and an aromatic carboxylic acid containing no olefinically unsaturated bond in the molecule.

Examples of the carboxylic acid having an unsaturated double bond include: unsaturated monocarboxylic acids such as acrylic acid, methacrylic acid, crotonic acid, isocrotonic acid, 2-pentenoic acid, 4-pentenoic acid, 2-heptenoic acid, 2-octenoic acid, cinnamic acid, myristoleic acid, palmitoleic acid, oleic acid, elaidic acid, vaccenic acid, gadoleic acid, erucic acid, nervonic acid, linoleic acid, linolenic acid, eleostearic acid, stearidonic acid, arachidonic acid, eicosapentaenoic acid, clupanodonic acid, docosahexaenoic acid, and sorbic acid; unsaturated dicarboxylic acids such as maleic acid, fumaric acid, itaconic acid, citraconic acid, and mesaconic acid. The carboxylic acid having an unsaturated double bond may be used in esterification in the form of salts or derivatives thereof, for example, unsaturated carboxylic acid anhydrides such as maleic anhydride, fumaric anhydride, itaconic anhydride, and citraconic anhydride; unsaturated dicarboxylic acid monoesters such as maleic acid monoalkyl ester, fumaric acid monoalkyl ester, and itaconic acid monoalkyl ester; and unsaturated dicarboxylic acid diesters such as maleic acid dialkyl ester, fumaric acid dialkyl ester, and itaconic acid dialkyl ester.

Examples of the aliphatic carboxylic acid containing no olefinically unsaturated bond in the molecule to be used in the present invention include: aliphatic monocarboxylic acids such as formic acid, acetic acid, propionic acid, butyric acid, valeric acid, caproic acid, caprylic acid, capric acid, lauric acid, myristic acid, palmitic acid, stearic acid, cyclohexane carboxylic acid, acetoacetic acid, glycolic acid, lactic acid, and ascorbic acid; aliphatic dicarboxylic acids such as oxalic acid, malonic acid, succinic acid, glutaric acid, adipic acid, pimelic acid, suberic acid, azelaic acid, sebacic acid, tartaric acid, and malic acid; and aliphatic tricarboxylic acids such as citric acid.

Furthermore, examples of the aromatic carboxylic acid containing no olefinically unsaturated bond in the molecule include: aromatic monocarboxylic acids such as phenylacetic acid, benzoic acid, toluic acid, p-hydroxybenzoic acid and salicylic acid; and aromatic dicarboxylic acids such as phthalic acid, isophthalic acid and terephthalic acid. Among these, particularly aliphatic carboxylic acid and/or aromatic carboxylic acid having two or more carboxyl groups in the molecule is preferable.

Such aliphatic carboxylic acid and aromatic carboxylic acid may be used in the form of salts or derivatives such as acid anhydrides and esters, when actually used in esterification.

It is preferable that a carboxylic acid having an unsaturated double bond in the molecule be used as the carboxylic acid compound in the present invention. In the case of using the carboxylic acid having an unsaturated double bond in the molecule, the unsaturated double bond introduced into the PVA polymer acts as an adsorbing point of vinyl chloride monomers, so that the vinyl chloride monomers in a dispersed state has a higher stability.

It is also preferable that a carboxylic acid having two or more carboxyl groups in the molecule be used as the carboxylic acid compound in the present invention. In the case of using the carboxylic acid having two or more carboxyl groups in the molecule, (1) if one carboxyl group reacts, water-solubility increases due to the effect of the other carboxyl group, thereby enhancing the stability of aqueous solution during storage, (2) if two carboxyl groups react, crosslinking of the PVA polymer (B) proceeds, thereby enhancing the stability of the vinyl chloride monomer in the dispersed state. (However, since the crosslinking may proceed so severely that the crosslinked product becomes insoluble in water depending on the reaction conditions, the reaction conditions should be appropriately adjusted so as to prevent the occurrence of excessive crosslinking: the after-mentioned reaction conditions may be employed, for example.)

The carboxylic acid compound may be used independently, or two or more kinds may be used in combination. In view of the performance of the dispersion stabilizing aid for suspension polymerization, particularly preferable carboxylic acid compounds are fumaric acid, itaconic acid, maleic acid, citraconic acid, mesaconic acid, crotonic acid, adipic acid, and lauric acid, and most preferable ones are fumaric acid, itaconic acid, and maleic acid.

In the present invention, the PVA polymer (B) has a saponification degree of less than 60 mol %, preferably less than 55 mol %, and particularly preferably 50 mol % or less. Although the lower limit of the saponification degree is not particularly limited, in view of producing the partially saponified PVA polymers, the saponification degree is preferably at least 10 mol %, and more preferably at least 20 mol %.

Moreover, the polymerization degree of the PVA polymer (B) is not particularly limited but is preferably 650 or less, more preferably 600 or less, and particularly preferably 550 or less. If the polymerization degree exceeds 650, removal of monomer components from the vinyl polymer particles to be obtained by suspension polymerization of a vinyl compound becomes difficult, or the plasticizer absorptivity decreases, undesirably. Although the lower limit of the polymerization degree is not particularly limited, in view of producing the partially saponified PVA polymers, the polymerization degree is preferably at least 50, and more preferably at least 80.

In the present invention, the PVA polymer (B) may be used independently, or two or more kinds each having a different property may be mixed to be used. In the present invention, the PVA polymer (A) and the PVA polymer (B) each can be produced by polymerizing vinyl ester monomers employing a conventionally known method such as a bulk polymerization method, a solution polymerization method, a suspension polymerization method, an emulsion polymerization method, and a dispersion polymerization method, followed by saponification of the resultant vinyl ester polymers. From the industrial viewpoint, preferable polymerization methods are the solution polymerization method, the emulsion polymerization method, and the dispersion polymerization method. For a polymerization operation, it is possible to employ any polymerization method selected from a batch method, a semibatch method, and a continuous method.

Examples of the vinyl ester monomers that can be used for polymerization include vinyl acetate, vinyl formate, vinyl propionate, vinyl caprylate, and vinyl versatate. Among these, the vinyl acetate is preferable from the industrial viewpoint.

In the polymerization of the vinyl ester monomers, the vinyl ester monomers can be copolymerized with other monomers without impairing the effects of the present invention. Examples of the monomers that can be used include: alpha-olefins such as ethylene, propylene, n-butene, and isobutylene; acrylic acid and salts thereof; acrylic acid esters such as methyl acrylate, ethyl acrylate, n-propyl acrylate, i-propyl acrylate, n-butyl acrylate, i-butyl acrylate, t-butyl acrylate, 2-ethylhexyl acrylate, dodecyl acrylate, and octadecyl acrylate; methacrylic acid and salts thereof; methacrylic acid esters such as methyl methacrylate, ethyl methacrylate, n-propyl methacrylate, i-propyl methacrylate, n-butyl methacrylate, i-butyl methacrylate, t-butyl methacrylate, 2-ethylhexyl methacrylate, dodecyl methacrylate, and octadecyl methacrylate; acrylamide, acrylamide derivatives such as N-methylacrylamide, N-ethylacrylamide, N,N-dimethylacrylamide, diacetone acrylamide, acrylamide propanesulfonic acid and salts thereof, acrylamide propyldimethylamine and acid salts thereof or quaternary salts thereof, and N-methylolacrylamide and derivatives thereof; methacrylamide, methacrylamide derivatives such as N-methylmethacrylamide, N-ethylmethacrylamide, methacrylamide propanesulfonic acid and salts thereof, methacrylamide propyldimethylamine and acid salts thereof or quaternary salts thereof, and N-methylolmethacrylamide and derivatives thereof; vinyl ethers such as methyl vinyl ether, ethyl vinyl ether, n-propyl vinyl ether, i-propyl vinyl ether, n-butyl vinyl ether, i-butyl vinyl ether, t-butyl vinyl ether, dodecyl vinyl ether, and stearyl vinyl ether; nitriles such as acrylonitrile and methacrylonitrile; halogenated vinyls such as vinyl chloride and vinyl fluoride; halogenated vinylidenes such as vinylidene chloride and vinylidene fluoride; allyl compounds such as allyl acetate and allyl chloride; unsaturated dicarboxylic acids such as maleic acid, itaconic acid, and fumaric acid, and salts thereof or esters thereof; vinylsilyl compounds such as vinyltrimethoxysilane; monomers containing an oxyalkylene group such as polyoxyethylene(meth)acrylate, polyoxypropylene(meth)acrylate, polyoxyethylene(meth)acrylic acid amide, polyoxypropylene(meth)acrylic acid amide, polyoxyethylene(1-(meth)acrylamide-1,1-dimethylpropyl) ester, polyoxyethylene (meth)allyl ether, polyoxypropylene (meth)allyl ether, polyoxyethylene vinyl ether, and polyoxypropylene vinyl ether; and isopropenyl acetate.

Furthermore, in the polymerization of vinyl ester monomers, a chain transfer agent can be present together for the purposes of, for example, adjusting the polymerization degree of the vinyl ester polymer to be obtained. Examples of the chain transfer agent include: aldehydes such as acetaldehyde, propionaldehyde, butyraldehyde, and benzaldehyde; ketones such as acetone, methylethyl ketone, hexanone, and cyclohexanone; mercaptans such as 2-hydroxyethanethiol and dodecyl mercaptan; and halogenated hydrocarbons such as trichloroethylene and perchloroethylene. Particularly, aldehydes and ketones are used suitably. The amount of the chain transfer agent to be added is determined according to the chain transfer constant of the chain transfer agent to be added and the target polymerization degree of the vinyl ester polymer. Generally, the amount is desirably 0.1 to 10 wt % with respect to the vinyl ester monomers.

In the present invention, a PVA polymer with a large content of 1,2-glycol bonds that can be obtained through saponification of a vinyl ester polymer obtained by polymerizing vinyl ester monomers under a higher temperature condition than usual also can be used. In this case, the content of 1,2-glycol bonds is preferably at least 1.9 mol %, more preferably at least 2.0 mol %, and further preferably at least 2.1 mol %.

An alcoholysis or hydrolysis reaction that is carried out using a conventionally known basic catalyst such as sodium hydroxide, potassium hydroxide, or sodium methoxide, or an conventionally known acidic catalyst such as p-toluenesulfonic acid can be used for the saponification reaction of a vinyl ester polymer. Examples of the solvent to be used for the saponification reaction include: alcohols such as methanol and ethanol; esters such as methyl acetate and ethyl acetate; ketones such as acetone and methylethyl ketone; and aromatic hydrocarbons such as benzene and toluene. These can be used independently, or two or more of them can be used in combination. Particularly, it is easy and preferable to use methanol or a mixed solution of methanol and methyl acetate as the solvent and carry out the saponification reaction in the presence of sodium hydroxide that serves as a basic catalyst.

The PVA polymer (A) and the PVA polymer (B) to be used in the present invention each may have an ionic functional group at the terminal thereof. Examples of the ionic functional group include a carboxyl group and a sulfonic acid group. Particularly, the carboxyl group is preferable. These ionic groups also include salts thereof, and an alkali metal salt is preferable, in consideration that the PVA polymer (A) and the PVA polymer (B) are preferably water dispersible. A method for introducing the ionic functional group into the terminal portion of the PVA polymer can be, for example, a method in which vinyl ester monomers such as vinyl acetate are polymerized in the presence of a thiol compound such as thiolacetic acid, mercaptopropionic acid, and 3-mercapto-1-propanesulfonic acid sodium salt, and the polymer thus obtained is saponified.

In the present invention, there is no particular limitation with respect to the method for esterifying the PVA polymer (B) with a carboxylic acid compounds. Examples of the method include: (i) a method in which the PVA polymer (B) is allowed to react with a carboxylic acid compound in an anhydrous solvent in a suspended state; (ii) a method in which a carboxylic acid compound that is in powder form or that has been dissolved or dispersed in water, methyl acetate, or alcohol such as methanol, ethanol, or propanol is mixed with the PVA polymer (B) in slurry form or powder form, which is then heat-treated under a nitrogen or air atmosphere to be reacted; (iii) a method in which a PVA polymer (B) obtained by adding a carboxylic acid compound to polyvinyl acetate in paste form and saponifying it is heat-treated; and (iv) a method in which a PVA polymer (B) and a carboxylic acid compound are dry-blended with, for example, a ribbon Brabender, a V-type Brabender, or a Henschel mixer, which is then melted and kneaded using, for example, a Banbury mixer, a mixing roll, a single or twin screw extruder, or a kneader. Among these, preferable methods are the method (ii) in which the PVA polymer (B) and a carboxylic acid compound are mixed, which is then heat-treated under a nitrogen atmosphere to be reacted and the method (iv) in which the PVA polymer (B) and a carboxylic acid compound are melted and kneaded. Further, in the esterification, the carboxylic acid compound may be reacted in the form of salts, or derivatives such as esters and acid anhydrides.

In the above-mentioned method (ii), the conditions for heat-treating the mixture of the PVA polymer (B) and a carboxylic acid compound are not particularly limited. However, the heat treatment temperature is preferably 60 to 190° C., more preferably 65 to 185° C., and further preferably 70 to 180° C. Furthermore, the heat treatment time is preferably 0.5 to 20 hours, more preferably 1 to 18 hours, and further preferably 1 to 16 hours.

In the aforementioned method (iv), the temperature to be employed for melting and mixing the PVA polymer (B) and a carboxylic acid compound is preferably 110 to 250° C., and more preferably 120 to 220° C. The period of time for which the PVA polymer (B) and a carboxylic acid compound are retained inside the apparatus to be used for melting and kneading them is preferably 1 to 15 minutes, and more preferably 2 to 10 minutes.

When the PVA polymer (B) and a carboxylic acid compound are heat-treated, a plasticizer that is used generally for PVA can be mixed to prevent coloring caused by the decomposition of PVA or formation of polyene in the main chain of PVA, and this also makes it possible to decrease the heat treatment temperature. Examples of the plasticizer include: polyhydric alcohols such as glycerol, diglycerol, polyethylene glycol, polypropylene glycol, and sorbitol; compounds obtained by addition of ethylene oxide to those alcohols; water; saccharides; polyethers; and amide compounds. One of these can be used, or two or more of them can be used in combination. The amount of these plasticizers to be used is generally 1 to 300 parts by weight, more preferably 1 to 200 parts by weight, and further preferably 1 to 100 parts by weight, with respect to 100 parts by weight of the PVA polymer.

Further, in the case that the carboxylic acid compound is a carboxylic acid having an unsaturated double bond, when the PVA polymer (B) and carboxylic acid having an unsaturated double bond are heat-treated, it also is possible to heat-treat them with a polymerization inhibitor mixed thereinto in order to prevent a gel from being formed through thermal polymerization of the PVA polymer (B) or carboxylic acid having an unsaturated double bond during the heat treatment. Examples of the polymerization inhibitor include phenolic polymerization inhibitors such as hydroquinone and hydroquinone monomethyl ether, phenothiazine, and N,N-diphenyl-p-phenylenediamine. The amount of the polymerization inhibitor to be mixed is preferably 0.00001 to 10 parts by weight, and more preferably 0.0001 to 1 part by weight, with respect to 100 parts by weight of the PVA polymer.

Furthermore, when the PVA polymer (B) and a carboxylic acid compound are heat-treated, it is preferable that alkali metal ions be contained at a ratio of 0.003 to 3 wt % with respect to 100 parts by weight of the PVA polymer (B), because in this case, for example, thermal degradation, pyrolysis, gelation, and coloring of the PVA polymer (B) can be prevented from occurring. Examples of the alkali metal ions include potassium ions, sodium ions, and magnesium ions. They are mainly present as salts of lower fatty acids such as acetic acid and propionic acid. In the case that the PVA polymer (B) has a carboxyl group or a sulfonic acid group, they are present as salts of these functional groups. The content of the alkali metal ions in the PVA polymer can be measured by an atomic absorption method.

In the present invention, in order to promote the esterification of the PVA polymer (B) with a carboxylic acid compound, it also is possible to heat-treat the PVA polymer (B) and the carboxylic acid compound with an acid substance or basic substance to serve as a catalyst being mixed therewith. Examples of the acid substance include inorganic acids such as hydrochloric acid, sulfuric acid, nitric acid, and phosphoric acid; organic acids such as formic acid, acetic acid, oxalic acid, and p-toluenesulfonic acid; salts such as pyridinium p-toluenesulfonate and ammonium chloride; and Lewis acids such as zinc chloride, aluminum chloride, iron(III) chloride, tin(II) chloride, tin(IV) chloride, and a boron trifluoride diethylether complex. One of these can be used, or two or more of them can be used in combination. Furthermore, examples of the basic substance include alkali metal hydroxides such as sodium hydroxide and potassium hydroxide; alkali metal carbonates such as sodium carbonate and potassium carbonate; metal oxides such as barium oxide and silver oxide; alkali metal hydrides such as sodium hydride and potassium hydride; alkali metal alkoxides such as sodium methoxide and sodium ethoxide; and alkali metal amides such as sodium amide and potassium amide. One of these can be used, or two or more of them can be used in combination. Generally, the amount of such an acid substance and basic substance to be mixed is preferably 0.0001 to 5 parts by weight with respect to 100 parts by weight of the PVA polymer.

By esterifying the PVA polymer (B) with the carboxylic acid compound, a PVA polymer (C) is obtained. The amount of modification with the carboxylic acid compound can be measured by, for example, a method in which an unreacted carboxylic acid is measured by liquid chromatography. In the case of using the carboxylic acid having an unsaturated double bond, it may be measured also by a method in which the PVA polymer (C) is dissolved in a DMSO-$d_6$ solvent, which is measured by $^1$H-NMR and thereby the signal derived from the double bond is analyzed.

The amount of monomer units esterified with the carboxylic acid compound in the PVA polymer (C) (the amount of carboxylic acid modification of the esterified PVA polymer (C)) is preferably 0.01 to 20 mol %, more preferably 0.01 to 18 mol %, further preferably 0.02 to 15 mol %, and particularly preferably 0.05 to 10 mol % in all monomer units of the PVA polymer (C).

In the present invention, in the case that the PVA polymer (C) is a PVA polymer obtained by esterifying the PVA polymer (B) with a carboxylic acid compound having two or more carboxyl groups, the carboxyl group that is not involved in the ester bond is reacted suitably with any one of hydroxides of monovalent to trivalent metals, salts, alkoxide, ammonia, ammonium salt, amine salt, and amine salts, in order to improve the water-solubility thereof.

In the dispersion stabilizer for suspension polymerization according to the present invention, the use ratio of the PVA polymer (A) to the PVA polymer (C) is preferably in the range from 99/1 to 5/95, more preferably from 95/5 to 10/90, further preferably from 95/5 to 15/85, expressed as the weight ratio of (A)/(C). If the weight ratio of (A)/(C) exceeds 99/1, there may be a case in which the plasticizer absorptivity of the vinyl polymer to be obtained by suspension polymerization of a vinyl compound decreases, or particle size distribution tends to be broad. Meanwhile, if it is less than 5/95, the polymerization stability in suspension polymerization of a vinyl compound may decrease.

Additives such as a preservative, a fungicide, an antiblocking agent, and an antifoamer that are used commonly in suspension polymerization can be added to the dispersion stabilizer for suspension polymerization of the present invention, as required.

The dispersion stabilizer for suspension polymerization of the present invention may be used by adding it to the polymerization system, as it is in powder form. Alternatively, the PVA polymer (A) and PVA polymer (C) may be used as a solution or dispersion by dissolving or dispersing them in a solvent such as water or methanol.

In the present invention, the amount of a dispersion stabilizer for suspension polymerization to be used is not particularly limited, but the total amount of the PVA polymer (A) and PVA polymer (C) is preferably 0.01 to 5 parts by weight, more preferably 0.02 to 2 parts by weight, further preferably 0.02 to 1 part by weight, with respect to 100 parts by weight of a vinyl compound. If the total amount is less than 0.01 part by weight, the polymerization stability in suspension polymerization of a vinyl compound tends to decrease. If it exceeds 5 parts by weight, the liquid waste after suspension polymerization tends to become cloudy, and the chemical oxygen demand (COD) tends to be high.

The dispersion stabilizer for suspension polymerization of the present invention is used suitably for suspension polymerization, particularly, of a vinyl compound. Examples of the vinyl compound include: vinyl halides such as vinyl chloride; vinyl esters such as vinyl acetate and vinyl propionate; acrylic acid, methacrylic acid, and esters and salts thereof; maleic acid, fumaric acid, and esters and anhydrides thereof; styrene, acrylonitrile, vinylidene chloride, and vinyl ether. Among these, particularly suitably, vinyl chloride is used independently or vinyl chloride and monomers capable of copolymerizing with vinyl chloride are used together in suspension copolymerization. Examples of the monomers capable of copolymerizing with vinyl chloride include: vinyl esters such as vinyl acetate and vinyl propionate; (meth)acrylic acid esters such as methyl (meth)acrylate and ethyl (meth)acrylate; alpha-olefins such as ethylene and propylene; unsaturated dicarboxylic acids such as maleic anhydride and itaconic acid; acrylonitrile, styrene, vinylidene chloride, and vinyl ether.

For suspension polymerization of a vinyl compound, an oil-soluble or water-soluble polymerization initiator that has been used conventionally for polymerization of vinyl chloride monomers can be used. Examples of the oil-soluble polymerization initiator include: percarbonate compounds such as diisopropyl peroxydicarbonate, di-2-ethylhexyl peroxydicarbonate, and diethoxyethyl peroxydicarbonate; perester compounds such as t-butyl peroxyneodecanoate, t-butylperoxypivalate, t-hexylperoxypivalate, and alpha-cumyl peroxyneodecanoate; peroxides such as acetylcyclohexylsulfonyl peroxide, 2,4,4-trimethylpentyl-2-peroxyphenoxyacetate, 3,5,5-trimethylhexanoyl peroxide, and lauroyl peroxide; and azo compounds such as azobis-2,4-dimethylvaleronitrile and azobis(4-2,4-dimethylvaleronitrile). Examples of the water-soluble polymerization initiator include potassium persulfate, ammonium persulfate, hydrogen peroxide, and cumene hydroperoxide. These oil-soluble or water-soluble polymerization initiators can be used independently, or two or more of them can be used in combination.

In the suspension polymerization of a vinyl compound, other various additives can be added to the polymerization reaction system as required. Examples of the additives include polymerization regulators such as aldehydes, halogenated hydrocarbons, and mercaptans, and polymerization inhibitors such as phenol compounds, sulfur compounds, and N-oxide compounds. Furthermore, a pH adjuster and a crosslinker also can be added optionally.

In suspension polymerization of a vinyl compound, the polymerization temperature is not particularly limited and can be adjusted to not only a lower temperature of around 20° C. but also a higher temperature exceeding 90° C. Furthermore, one of preferred embodiments also includes use of a polymerizer equipped with a reflux condenser in order to improve the heat removal efficiency of the polymerization reaction system.

The dispersion stabilizer for suspension polymerization of the present invention may be used independently but may be used in combination with: water-soluble cellulose ether such as methylcellulose, hydroxyethylcellulose, hydroxypropylcellulose, or hydroxypropyl methylcellulose, a water-soluble polymers such as gelatin; an oil-soluble emulsifier such as sorbitan monolaurate, sorbitan trioleate, glycerol tristearate, or an ethylene oxide/propylene oxide block copolymer; or a water-soluble emulsifier such as polyoxyethylene sorbitan monolaurate, polyoxyethylene glycerol oleate, or sodium laurate, which are used commonly in suspension polymerization of a vinyl compound in an aqueous solvent. The amount to be added thereof is not particularly limited, but is preferably 0.01 to 1.0 part by weight per 100 parts by weight of a vinyl compound.

Hereinafter, the present invention is described in further detail using examples, however, the present invention is not limited to these examples. In the following examples and comparative examples, "part(s)" and "%" denote "part(s) by weight" and "wt %", respectively, unless otherwise specified.

It should be noted that PVA polymers and vinyl chloride polymer particles were evaluated as follows.

<Analysis of PVA Polymer>

(1) Measurement of Polymerization Degree

It was carried out according to JIS K6726.

(2) Measurement of Saponification Degree

It was carried out according to JIS K6726.

(3) Measurement of Amount of Carboxylic Acid Modification

An HPLC measurement was performed at 30° C. in which 1 g of the PVA polymer was dissolved in 100 g of ion-exchanged water, an ODS column was used and an aqueous solution of 0.1 M ammonium dihydrogen phosphate was used as a mobile phase. The amount of carboxylic acid modification was obtained from the quantitative result of an unreacted carboxylic acid.

<Evaluation of Vinyl Chloride Polymer Particles>

With respect to the vinyl chloride polymer particles, the particle size distribution, the plasticizer absorptivity, the amount of the residual monomers, and the occurrence rate of fish-eyes were measured according to the following methods. Table 1 indicates the evaluation results.

(1) Particle Size Distribution of Vinyl Chloride Polymer Particles

The content retained on a 42-mesh JIS standard sieve was indicated in wt %.

A: less than 0.5%
B: not less than 0.5% and less than 1%
C: 1% or more

The content retained on an 80-mesh JIS standard sieve was indicated in wt %.

A: less than 5%
B: not less than 5% and less than 10%
C: 10% or more

The smaller the number is, the smaller is the amount of coarse particles and the sharper is the particle size distribution, which indicates excellent polymerization stability.

(2) Amount of Plasticizer Absorption

According to the method described in ASTM-D3367-75, the amount of absorption (%) of dioctyl phthalate at 23° C. was measured.

(3) Amount of Residual Vinyl Chloride Monomers

The content of residual vinyl chloride monomers in the vinyl chloride resin was quantitated with a gas chromatograph after 1 g of vinyl chloride polymer particles was dissolved in 25 g of tetrahydrofuran.

A: less than 5 ppm
B: not less than 5 ppm and less than 10 ppm
C: 10 ppm or more (4) The Occurrence Rate of Fish-eyes Five sheets with the thickness of 0.1 mm and the size of 1400 mm×1400 mm were produced by roll-milling 100 parts of vinyl chloride polymer particles, 50 parts of dioctyl phthalate (DOP), 5 parts of tribasic lead sulfate and 1 part of lead stearate for 7 minutes at 150° C., and the number of fish-eyes was counted. The occurrence rate of fish-eyes was expressed as the number of fish-eyes per 1000 cm$^2$, and evaluated by the following criteria.

A: 0 to 3 fish-eyes, which is an exceptionally small number
B: 4 to 10 fish-eyes, which is a small number
C: 11 or more fish-eyes, which is a large number

EXAMPLE 1

Synthesis of PVA Polymer (C)—Heat-treating Method

After 100 parts by weight of the powdered PVA polymer (B) having a polymerization degree of 550 and a saponification degree of 50 mol % was added to a solution obtained by dissolving 1 part by weight of fumaric acid in 200 parts by weight of methanol and was then allowed to swell, it was dried under reduced pressure at a temperature of 40° C. for 24 hours. Subsequently, this was heat-treated under a nitrogen atmosphere at 120° C. for three hours. Thus, a PVA polymer (C) was obtained. The amount of carboxylic acid modification was 0.2 mol %.

<Suspension Polymerization of Vinyl Chloride>

The PVA polymer (A) having a polymerization degree of 850 and a saponification degree of 72 mol % and the PVA polymer (C) obtained above were dissolved in deionized water in amounts equivalent to 800 ppm and 400 ppm with respect to vinyl chloride monomers, respectively and thus a dispersion stabilizer was prepared. Thus obtained dispersion stabilizer was introduced into a glass-lined autoclave to which a scale antiadhesion agent, NOXOL WSW (manufactured by CIRS) had been applied to be 0.3 g/m$^2$ as a solid content. Subsequently, 0.04 part of 70% solution of diisopropyl peroxydicarbonate in toluene was introduced into the glass-lined autoclave. Oxygen was then removed through deaeration carried out until the pressure inside the autoclave was reduced to 0.0067 MPa. Thereafter, 30 parts of vinyl chloride was introduced, and the temperature of the content inside the autoclave was increased to 63° C., and polymerization was thus started under stirring. The pressure inside the autoclave at the start of polymerization was 1.02 MPa. At the time when five hours had elapsed after the start of polymerization and the pressure inside the autoclave had reached 0.5 MPa, polymerization was stopped, and unreacted vinyl chloride was removed. Thereafter, the polymerization reactant was taken out and was dried at 65° C. for 16 hours. Thus, vinyl chloride polymer particles were obtained.

EXAMPLES 2 to 6

Using a PVA polymer (C) synthesized in the same manner as in Example 1 except that a PVA polymer (B) and a carboxylic acid having an unsaturated double bond indicated in Table 1 were used and the heat treatment was carried out under the conditions indicated in Table 1, suspension polymerization of vinyl chloride was carried out in the same manner as in Example 1. Thus, vinyl chloride polymer particles were obtained. Table 1 indicates the evaluation results of the vinyl chloride polymer particles.

COMPARATIVE EXAMPLES 1 and 2

Using a PVA polymer (C) synthesized in the same manner as in Example 1 except that the powdered PVA polymer (B) was used while no carboxylic acid compound was used and the heat treatment was carried out under the conditions indicated in Table 1, suspension polymerization of vinyl chloride was carried out in the same manner as in Example 1 in the used amount indicated in Table 1. Thus, vinyl chloride polymer particles were obtained. Table 1 indicates the evaluation results. Coarse particles were contained and uniform polymer particles were not obtained. Furthermore, a large amount of the vinyl chloride monomers remained and a large number of fish-eyes occurred.

COMPARATIVE EXAMPLE 3

Suspension polymerization of vinyl chloride was carried out in the same manner as in Example 1 except that no heat treatment was carried out, although a carboxylic acid having an unsaturated double bond indicated in Table 1 was used. Thus, vinyl chloride polymer particles were obtained. Table 1 indicates the evaluation results. Coarse particles were contained and uniform polymer particles were not obtained. Furthermore, a large amount of the vinyl chloride monomers remained and a large number of fish-eyes occurred.

COMPARATIVE EXAMPLE 4

Suspension polymerization of vinyl chloride was carried out in the same manner as in Example 1 except that no PVA polymer (A) was used and only a PVA polymer (C) was used in an amount equivalent to 400 ppm with respect to vinyl chloride monomers. Thus, vinyl chloride polymer particles were obtained. Table 1 indicates the evaluation results. Polymerization was not carried out stably, resulting in a blocked state.

COMPARATIVE EXAMPLE 5

<Process for Producing Itaconic Acid-modified PVA Polymer>

1200 g of vinyl acetate and 1800 g of methanol were introduced into a 6 L reactor that was equipped with a stirrer, a nitrogen inlet, a reflux condenser and an additive inlet, and the temperature thereof was increased to 60° C. Then, the atmosphere inside the system was replaced by nitrogen through 30-minute nitrogen bubbling. A solution was prepared by dissolving itaconic acid as comonomers in methanol at a concentration of 20%, and the atmosphere thereof was replaced by nitrogen through bubbling with nitrogen gas. The temperature inside the reactor was adjusted to 60° C., and 3.0 mL of 20% itaconic acid-methanol solution was added. Thereafter, 2.0 g of 2,2'-azobis(isobutyronitrile) was added thereto so that polymerization was started. During polymerization, the polymerization temperature was maintained at 60° C., and 20% itaconic acid-methanol solution was continuously added at a rate of 15 mL/hour. At the time when 4.5 hours had elapsed and polymerization rate had reached 65%, polymerization was stopped by cooling. Subsequently, a methanol solution of modified PVAc was obtained by removing unreacted vinyl acetate monomers under reduced pressure. To the methanol solution adjusted to 40% was added a NaOH methanol solution (10% concentration) so that the alkali mole ratio (the mole number of NaOH/the mole number of the vinyl ester units in the modified PVAc) is 0.01, thus causing saponification. The saponification degree of the modified PVA thus obtained was 50 mol %.

Reprecipitation purification was repeated three times in which the methanol solution of the modified PVAc obtained by removing unreacted vinyl acetate monomers after polymerization was dropped into n-hexane, allowing the modified PVAc to precipitate, and then the collected modified PVAc was dissolved in acetone. Thereafter, it was dried under reduced pressure at 60° C. Thus, a purified matter of the modified PVAc was obtained. The amount of modification of the modified PVAc measured by proton NMR was 1 mol %. After saponification of the above methanol solution of the modified PVAc with alkali mole ratio of 0.2, Soxhlet extraction with methanol was performed for three days, followed by drying. Thus, a purified matter of the modified PVA was obtained. The average polymerization degree of the modified PVA was 550, as measured according to JIS K6726, which is a conventional method.

Using the itaconic acid-modified PVA polymer obtained by the above operation that has a polymerization degree of 550, a saponification degree of 50 mol %, and an amount of modification of 1.0 mol %, suspension polymerization of vinyl chloride was carried out in the same manner as in Example 1. Thus, vinyl chloride polymer particles were obtained. Table 1 indicates the evaluation results. Coarse particles were contained and uniform polymer particles were not obtained. Furthermore, a large amount of the vinyl chloride monomers remained and a large number of fish-eyes occurred.

COMPARATIVE EXAMPLE 6

<Process for Producing Maleic Acid-modified PVA Polymer>

1200 g of vinyl acetate and 1800 g of methanol were introduced into a 6 L reactor that was equipped with a stirrer, a nitrogen inlet, a reflux condenser and an additive inlet, and the temperature thereof was increased to 60° C. Then, the atmosphere inside the system was replaced by nitrogen through 30-minute nitrogen bubbling. A solution was prepared by dissolving maleic anhydride as comonomers in methanol at a concentration of 50%, and the atmosphere thereof was replaced by nitrogen through bubbling with nitrogen gas. The temperature inside the reactor was adjusted to 60° C. and 1.8 mL of 50% maleic anhydride-methanol solution was added. Thereafter, 2.0 g of 2,2'-azobis (isobutyronitrile) was added thereto so that polymerization was started. During polymerization, the polymerization temperature was maintained at 60° C., and 50% maleic anhydride-methanol solution was continuously added at a rate of 2.5 mL/hour. At the time when 4.5 hours had elapsed and polymerization rate had reached 65%, polymerization was stopped by cooling. Subsequently, a methanol solution of modified PVAc was obtained by removing unreacted vinyl acetate monomers under reduced pressure. To the methanol solution adjusted to 40% was added a NaOH methanol solution (10% concentration) so that the alkali mole ratio (the mole number of NaOH/ the mole number of the vinyl ester units in the modified PVAc) is 0.01, thus causing saponification. The saponification degree of the modified PVA thus obtained was 50 mol %.

Reprecipitation purification was repeated three times in which the methanol solution of the modified PVAc obtained by removing unreacted vinyl acetate monomers after polymerization was dropped into n-hexane, allowing the modified PVAc to precipitate, and then the collected modified PVAc was dissolved in acetone. Thereafter, it was dried under reduced pressure at 60° C. Thus, a purified matter of the modified PVAc was obtained. The amount of modification of the modified PVAc measured by proton NMR was 0.5 mol %. After saponification of the above methanol solution of the modified PVAc with alkali mole ratio of 0.2, Soxhlet extraction with methanol was performed for three days, followed by drying. Thus, a purified matter of the modified PVA was obtained. The average polymerization degree of the modified PVA was 550, as measured according to JIS K6726, which is a conventional method.

Using the maleic acid-modified PVA polymer obtained by the above operation that has a polymerization degree of 550, a saponification degree of 50 mol %, and an amount of modification of 0.5 mol %, suspension polymerization of vinyl chloride was carried out in the same manner as in Example 1. Thus, vinyl chloride polymer particles were obtained. Table 1 indicates the evaluation results. Coarse particles were contained and uniform polymer particles were not obtained. Furthermore, a large amount of the vinyl chloride monomers remained and a large number of fish-eyes occurred.

TABLE 1

| | PVA (A) | | PVA (B) | | PVA (C) | | | |
|---|---|---|---|---|---|---|---|---|
| | | | | | Heat-treatment conditions | | | |
| | Polymerization degree | Saponification degree (mol %) | Polymerization degree | Saponification degree (mol %) | Temperature (° C.) | Period of time | Carboxylic acid compound[1] | Amount of modification (mol %) |
| Ex. 1 | 850 | 72 | 550 | 50 | 120 | 3 h | Fumaric acid (1) | 0.2 |
| Ex. 2 | 850 | 72 | 550 | 50 | 120 | 3 h | Itaconic acid (1) | 0.2 |
| Ex. 3 | 850 | 72 | 550 | 50 | 80 | 3 h | Maleic anhydride (0.5) | 0.2 |
| Ex. 4 | 850 | 72 | 550 | 50 | 80 | 3 h | Maleic anhydride (10) | 4.6 |
| Ex. 5 | 850 | 72 | 550 | 50 | 80 | 3 h | Maleic anhydride (20) | 12.4 |
| Ex. 6 | 850 | 72 | 550 | 50 | 120 | 3 h | Crotonic acid (0.5) | 0.1 |
| C. Ex. 1 | 850 | 72 | 550 | 50 | 120 | 3 h | — | — |
| C. Ex. 2 | 850 | 72 | 550 | 50 | 120 | 3 h | — | — |
| C. Ex. 3 | 850 | 72 | 550 | 50 | — | — | Maleic anhydride (0.5) | 0.0 |
| C. Ex. 4 | — | — | 550 | 50 | 120 | 3 h | Maleic anhydride (0.5) | 0.2 |
| C. Ex. 5 | 850 | 72 | Itaconic acid-modified PVA polymer | | | | | |
| C. Ex. 6 | 850 | 72 | Maleic acid-modified PVA polymer | | | | | |

| | | | Vinyl chloride polymer | | | | |
|---|---|---|---|---|---|---|---|
| | | | Particle size distribution | | | | |
| | Used amount of PVA (A) (ppm) | Used amount of PVA (C) (ppm) | 42 mesh | 80 mesh | Plasticizer absorptivity (%) | Amount of residual monomers | Fish-eyes occurence ratio |
| Ex. 1 | 800 | 400 | A | A | 18.0 | A | A |
| Ex. 2 | 800 | 400 | A | A | 18.2 | A | A |
| Ex. 3 | 800 | 400 | A | A | 18.1 | A | A |
| Ex. 4 | 800 | 400 | A | A | 17.5 | B | A |
| Ex. 5 | 800 | 400 | A | B | 16.5 | B | B |
| Ex. 6 | 800 | 400 | A | A | 18.0 | B | A |
| C. Ex. 1 | 800 | 400 | C | C | 15.0 | C | C |
| C. Ex. 2 | 800 | 500 | B | C | 17.2 | C | B |
| C. Ex. 3 | 800 | 400 | C | C | 15.0 | C | C |
| C. Ex. 4 | — | 400 | — | — | — | — | — |
| C. Ex. 5 | 800 | 400[2] | C | C | 14.5 | C | C |
| C. Ex. 6 | 800 | 400[3] | C | C | 15.0 | C | C |

[1]The number indicated in parenthesis denotes the amount (parts by weight) mixed with respect to 100 parts by weight of PVA (A)
[2]The used amount of itaconic acid-modified PVA polymer (polymerization degree: 550, saponification degree: 50 mol %, amount of modification 1.0 mol %) that was used instead of PVA (C)
[3]The used amount of maleic acid-modified PVA polymer (polymerization degree: 550, saponification degree: 50 mol %, amount of modification: 0.5 mol %) that was used instead of PVA (C)

EXAMPLE 7

<Synthesis of PVA Polymer (C)—Melting and Kneading Method>

With respect to 100 parts by weight of the powdered PVA polymer (B) having a polymerization degree of 250 and a saponification degree of 40 mol %, 1 part by weight of fumaric acid was dry-blended. This was melted and kneaded at a temperature of 160° C. for three minutes using a Labo Prastomill. Thus, a PVA polymer (C) was obtained. The amount of carboxylic acid modification was 0.4 mol %.

<Suspension Polymerization of Vinyl Chloride>

Suspension polymerization of vinyl chloride was carried out in the same manner as in Example 1. The resultant vinyl chloride polymer particles were evaluated in the same manner as in Example 1. Table 2 indicates the evaluation results.

EXAMPLES 8 to 10

Using a PVA polymer (C) synthesized in the same manner as in Example 7 except that a carboxylic acid having an unsaturated double bond indicated in Table 2 was used and the heat treatment was carried out under the conditions indicated in Table 2, suspension polymerization of vinyl chloride was carried out in the same manner as in Example 1. Thus, vinyl chloride polymer particles were obtained. Table 2 indicates the evaluation results of the vinyl chloride polymer particles.

COMPARATIVE EXAMPLES 7 and 8

Using a PVA polymer (C) synthesized in the same manner as in Example 7 except for carrying out melting and kneading without dry-blending fumaric acid, suspension polymerization of vinyl chloride was carried out in the same manner as in Example 1 in the used amount indicated in Table 2. However, coarse particles were contained and uniform polymer particles were not obtained. Furthermore, a large amount of the vinyl chloride monomers remained and a large number of fish-eyes occurred.

TABLE 2

| | PVA (A) | | PVA (B) | | PVA (C) | | | |
| --- | --- | --- | --- | --- | --- | --- | --- | --- |
| | | | | | Melting and kneading conditions | | | |
| | Polymerization degree | Saponification degree (mol %) | Polymerization degree | Saponification degree (mol %) | Temperature (° C.) | Period of time | Carboxylic acid compound[1] | Amount of modification (mol %) |
| Ex. 7 | 850 | 72 | 250 | 40 | 160 | 3 min. | Fumaric acid (1) | 0.4 |
| Ex. 8 | 850 | 72 | 250 | 40 | 160 | 3 min. | Maleic acid (0.5) | 0.2 |
| Ex. 9 | 850 | 72 | 250 | 40 | 160 | 3 min. | Itaconic acid (1) | 0.4 |
| Ex. 10 | 850 | 72 | 250 | 40 | 160 | 3 min. | Crotonic acid (1) | 0.5 |
| C. Ex. 7 | 850 | 72 | 250 | 40 | 160 | 3 min. | — | — |
| C. Ex. 8 | 850 | 72 | 250 | 40 | 160 | 3 min. | — | — |

| | | | Vinyl chloride polymer | | | | |
| --- | --- | --- | --- | --- | --- | --- | --- |
| | | | Particle size distribution | | | | |
| | Used amount of PVA (A) (ppm) | Used amount of PVA (C) (ppm) | 42 mesh | 80 mesh | Plasticizer absorptivity (%) | Amount of residual monomers | Fish-eyes occurence ratio |
| Ex. 7 | 800 | 200 | A | A | 16.5 | A | A |
| Ex. 8 | 800 | 200 | A | A | 16.6 | A | A |
| Ex. 9 | 800 | 200 | A | A | 16.3 | A | A |
| Ex. 10 | 800 | 200 | A | A | 16.0 | A | A |
| C. Ex. 7 | 800 | 200 | C | C | 13.0 | C | C |
| C. Ex. 8 | 800 | 250 | B | B | 15.8 | B | C |

[1] The number indicated in parenthesis denotes the amount (parts by weight) mixed with respect to 100 parts by weight of PVA (A)

EXAMPLE 11

<Synthesis of PVA Polymer (C)—Heat-treating Method>

After 100 parts by weight of the powdered PVA polymer (B) having a polymerization degree of 600 and a saponification degree of 50 mol % was added to a solution obtained by dissolving 1 part by weight of adipic acid in 200 parts by weight of methanol and was then allowed to swell, it was dried under reduced pressure at a temperature of 40° C. for 24 hours. Subsequently, this was heat-treated under a nitrogen atmosphere at 120° C. for three hours. Thus, a PVA polymer (C) was obtained. The amount of carboxylic acid modification was 0.2 mol %.

<Suspension Polymerization of Vinyl Chloride>

The PVA polymer (A) having a polymerization degree of 780 and a saponification degree of 72 mol % and the PVA polymer (C) obtained above were dissolved in deionized water in amounts equivalent to 800 ppm and 350 ppm with respect to vinyl chloride monomers, respectively and thus a dispersion stabilizer was prepared. Thus obtained dispersion stabilizer was introduced into a glass-lined autoclave to which a scale antiadhesion agent, NOXOL WSW (manufactured by CIRS) had been applied to be 0.3 g/m$^2$ as a solid content. Subsequently, 0.04 part of 70% solution of diisopropyl peroxydicarbonate in toluene was introduced into the glass-lined autoclave. Oxygen was then removed through deaeration carried out until the pressure inside the autoclave was reduced to 0.0067 MPa. Thereafter, 30 parts of vinyl chloride was introduced, and the temperature of the content inside the autoclave was increased to 63° C., and polymerization was thus started under stirring. The pressure inside the autoclave at the start of polymerization was 1.02 MPa. At the time when five hours had elapsed after the start of polymerization and the pressure inside the autoclave had reached 0.5 MPa, polymerization was stopped, and unreacted vinyl chloride was removed. Thereafter, the polymerization reactant was taken out and was dried at 65° C. for 16 hours. Thus, vinyl chloride polymer particles were obtained.

EXAMPLES 12 to 14

Using a PVA polymer (C) synthesized in the same manner as in Example 11 except that a PVA polymer (B) and a carboxylic acid containing no olefinically unsaturated bond in the molecule indicated in Table 3 were used and the heat treatment was carried out under the conditions indicated in Table 3, suspension polymerization of vinyl chloride was carried out in the same manner as in Example 11. Thus, vinyl chloride polymer particles were obtained. Table 3 indicates the evaluation results of the vinyl chloride polymer particles.

COMPARATIVE EXAMPLES 9 and 10

Using a PVA polymer (C) synthesized in the same manner as in Example 11 except that the powdered PVA polymer (B) was used while no carboxylic acid compound was used and the heat treatment was carried out under the conditions indicated in Table 3, suspension polymerization of vinyl chloride was carried out in the same manner as in Example 11 in the used amount indicated in Table 3. Thus, vinyl chloride polymer particles were obtained. Table 3 indicates the evaluation results. Coarse particles were contained and uniform polymer particles were not obtained. Furthermore, a large amount of the vinyl chloride monomers remained and a large number of fish-eyes occurred.

COMPARATIVE EXAMPLE 11

Suspension polymerization of vinyl chloride was carried out in the same manner as in Example 11 except that no heat treatment was carried out. Thus, vinyl chloride polymer particles were obtained. Table 3 indicates the evaluation results. Coarse particles were contained and uniform polymer particles were not obtained. Furthermore, a large amount of the vinyl chloride monomers remained and a large number of fish-eyes occurred.

COMPARATIVE EXAMPLE 12

Suspension polymerization of vinyl chloride was carried out in the same manner as in Example 11 except that no PVA polymer (A) was used and only a PVA polymer (C) was used in an amount equivalent to 350 ppm with respect to vinyl chloride monomers. Thus, vinyl chloride polymer particles were obtained. Table 3 indicates the evaluation results. Polymerization was not carried out stably, resulting in a blocked state.

TABLE 3

| | PVA (A) | | PVA (B) | | PVA (C) | | | |
| --- | --- | --- | --- | --- | --- | --- | --- | --- |
| | | | | | Heat-treatment conditions | | | |
| | Polymerization degree | Saponification degree (mol %) | Polymerization degree | Saponification degree (mol %) | Temperature (° C.) | Period of time | Carboxylic acid compound[1] | Amount of modification (mol %) |
| Ex. 11 | 780 | 72 | 600 | 50 | 130 | 5 h | Adipic acid (1) | 0.2 |
| Ex. 12 | 780 | 72 | 600 | 50 | 120 | 5 h | Phthalic acid (1) | 0.2 |
| Ex. 13 | 780 | 72 | 600 | 50 | 120 | 5 h | Phthalic acid (10) | 2.7 |
| Ex. 14 | 780 | 72 | 600 | 50 | 120 | 5 h | Phthalic acid (40) | 11.1 |
| C. Ex. 9 | 780 | 72 | 600 | 50 | 120 | 5 h | — | — |
| C. Ex. 10 | 780 | 72 | 600 | 50 | 120 | 5 h | — | — |
| C. Ex. 11 | 780 | 72 | 600 | 50 | — | — | Adipic acid (1) | 0.0 |
| C. Ex. 12 | — | — | 600 | 50 | 130 | 5 h | Adipic acid (1) | 0.2 |

TABLE 3-continued

| | Used amount of PVA (A) (ppm) | Used amount of PVA (C) (ppm) | Vinyl chloride polymer | | | | |
|---|---|---|---|---|---|---|---|
| | | | Particle size distribution | | Plasticizer absorptivity (%) | Amount of residual monomers | Fish-eyes occurence ratio |
| | | | 42 mesh | 80 mesh | | | |
| Ex. 11 | 800 | 350 | A | A | 16.5 | A | A |
| Ex. 12 | 800 | 350 | A | A | 16.6 | A | A |
| Ex. 13 | 800 | 350 | A | A | 16.3 | A | A |
| Ex. 14 | 800 | 350 | A | B | 16.0 | B | A |
| C. Ex. 9 | 800 | 350 | C | C | 14.8 | C | C |
| C. Ex. 10 | 800 | 450 | B | C | 16.8 | C | B |
| C. Ex. 11 | 800 | 350 | C | C | 14.7 | C | C |
| C. Ex. 12 | — | 350 | — | — | — | — | — |

[1] The number indicated in parenthesis denotes the amount (parts by weight) mixed with respect to 100 parts by weight of PVA (A)

EXAMPLE 15

<Synthesis of PVA Polymer (C)—Melting and Kneading Method>

With respect to 100 parts by weight of the powdered PVA polymer (B) having a polymerization degree of 200 and a saponification degree of 35 mol %, 1 part by weight of adipic acid was dry-blended. This was melted and kneaded at a temperature of 160° C. for three minutes using a Labo Prastomill. Thus, a PVA polymer (C) was obtained. The amount of carboxylic acid modification was 0.4 mol %.

<Suspension Polymerization of Vinyl Chloride>

Suspension polymerization of vinyl chloride was carried out in the same manner as in Example 11. The resultant vinyl chloride polymer particles were evaluated in the same manner as in Example 11. Table 4 indicates the evaluation results.

EXAMPLES 16 and 17

Using a PVA polymer (C) synthesized in the same manner as in Example 15 except that a carboxylic acid indicated in Table 4 was used, suspension polymerization of vinyl chloride was carried out in the same manner as in Example 11. Thus, vinyl chloride polymer particles were obtained. Table 4 indicates the evaluation results of the vinyl chloride polymer particles.

COMPARATIVE EXAMPLES 13 and 14

Using a PVA polymer (C) synthesized in the same manner as in Example 15 except for carrying out melting and kneading without dry-blending adipic acid, suspension polymerization of vinyl chloride was carried out in the same manner as in Example 11 in the used amount indicated in Table 4. However, coarse particles were contained and uniform polymer particles were not obtained. Furthermore, a large amount of the vinyl chloride monomers remained and a large number of fish-eyes occurred.

TABLE 4

| | PVA (A) | | PVA (B) | | PVA (C) | | | |
|---|---|---|---|---|---|---|---|---|
| | | | | | Melting and kneading conditions | | | |
| | Polymerization degree | Saponification degree (mol %) | Polymerization degree | Saponification degree (mol %) | Temperature (° C.) | Period of time | Carboxylic acid compound[1] | Amount of modification (mol %) |
| Ex. 15 | 780 | 72 | 200 | 35 | 160 | 4 min. | Adipic acid (1) | 0.4 |
| Ex. 16 | 780 | 72 | 200 | 35 | 160 | 4 min. | Phthalic acid (1) | 0.4 |
| Ex. 17 | 780 | 72 | 200 | 35 | 160 | 4 min. | Lauric acid (1) | 0.2 |
| C. Ex. 13 | 780 | 72 | 200 | 35 | 160 | 4 min. | — | — |
| C. Ex. 14 | 780 | 72 | 200 | 35 | 160 | 4 min. | — | — |

TABLE 4-continued

|  | Used amount of PVA (A) (ppm) | Used amount of PVA (C) (ppm) | Vinyl chloride polymer | | | | |
|---|---|---|---|---|---|---|---|
|  |  |  | Particle size distribution | | Plasticizer absorptivity (%) | Amount of residual monomers | Fish-eyes occurence ratio |
|  |  |  | 42 mesh | 80 mesh |  |  |  |
| Ex. 15 | 800 | 150 | A | A | 16.2 | A | A |
| Ex. 16 | 800 | 150 | A | A | 16.2 | A | A |
| Ex. 17 | 800 | 150 | A | A | 16.0 | A | A |
| C. Ex. 13 | 800 | 150 | C | C | 14.0 | C | C |
| C. Ex. 14 | 800 | 200 | B | B | 15.9 | B | C |

1)The number indicated in parenthesis denotes the amount (parts by weight) mixed with respect to 100 parts by weight of PVA (A)

INDUSTRIAL APPLICABILITY

In the case that the dispersion stabilizer for suspension polymerization of a vinyl compound according to the present invention is used even in a small amount, the vinyl polymer particles to be obtained have properties such that (1) the plasticizer absorptivity is high, leading to easy processing, (2) residual monomer components such as a vinyl compound can be removed easily, (3) the number of coarse particles to be formed is small due to high polymerization stability, (4) the particle size is uniform, and (5) formation of fish-eyes or the like can be prevented. Thus, industrial evaluation thereof is quite high.

The invention claimed is:

1. A dispersion stabilizer for suspension polymerization, comprising:
   a polyvinyl alcohol polymer (A) having a saponification degree of 60 mol % or more and a polymerization degree of 200 or more, and
   a polyvinyl alcohol polymer (C) obtained by esterifying a polyvinyl alcohol polymer (B) having a saponification degree of less than 60 mol % with a carboxylic acid compound,
   wherein, by the esterifying, a vinyl ester unit, different from the vinyl ester unit included in polyvinyl alcohol polymer (B), is introduced into the polyvinyl alcohol polymer (B), and
   wherein an amount of modification with the carboxylic acid compound in the polyvinyl alcohol polymer (C) is 0.01 to 20 mol %, based on all monomer units in the polyvinyl alcohol polymer (C).

2. The dispersion stabilizer for suspension polymerization according to claim 1, wherein the weight ratio (A)/(C) of the polyvinyl alcohol polymer (A) to the polyvinyl alcohol polymer (C) is in the range from 99/1 to 5/95.

3. The dispersion stabilizer for suspension polymerization according to claim 2, wherein the polyvinyl alcohol polymer (A) has a saponification degree of 65 to 95 mol %.

4. The dispersion stabilizer for suspension polymerization according to claim 2, wherein the polyvinyl alcohol polymer (A) has a saponification degree of 70 to 90 mol %.

5. The dispersion stabilizer for suspension polymerization according to claim 2, wherein the amount of modification with the carboxylic acid compound in the polyvinyl alcohol polymer (C) is 0.01 to 18 mol %, based on all monomer units in the polyvinyl alcohol polymer (C).

6. The dispersion stabilizer for suspension polymerization according to claim 1, wherein the carboxylic acid compound has an unsaturated double bond in the molecule.

7. The dispersion stabilizer for suspension polymerization according to claim 1, wherein the carboxylic acid compound has two or more carboxyl groups in the molecule.

8. The dispersion stabilizer for suspension polymerization according to claim 1, wherein the polymerization degree of the polyvinyl alcohol polymer (A) is 200 to 8,000.

9. The dispersion stabilizer for suspension polymerization according to claim 1, wherein the amount of modification with the carboxylic acid compound in the polyvinyl alcohol polymer (C) is 0.02 to 15 mol %, based on all monomer units in the polyvinyl alcohol polymer (C).

10. The dispersion stabilizer for suspension polymerization according to claim 1, wherein the amount of modification with the carboxylic acid compound in the polyvinyl alcohol polymer (C) is 0.05 to 10 mol %, based on all monomer units in the polyvinyl alcohol polymer (C).

11. The dispersion stabilizer for suspension polymerization according to claim 1, wherein the weight ratio (A)/(C) of the polyvinyl alcohol polymer (A) to the polyvinyl alcohol polymer (C) is in the range from 95/5 to 10/90.

12. The dispersion stabilizer for suspension polymerization according to claim 1, wherein the weight ratio (A)/(C) of the polyvinyl alcohol polymer (A) to the polyvinyl alcohol polymer (C) is in the range from 95/5 to 15/85.

13. The dispersion stabilizer for suspension polymerization according to claim 1, wherein the carboxylic acid compound is an aliphatic carboxylic acid containing no olefinically unsaturated bond in the molecule.

14. The dispersion stabilizer for suspension polymerization according to claim 1, wherein the carboxylic acid compound is an aromatic carboxylic acid containing no olefinically unsaturated bond in the molecule.

15. The dispersion stabilizer for suspension polymerization according to claim 1, wherein the carboxylic acid compound is an aliphatic carboxylic acid having two or more carboxyl groups in the molecule.

16. The dispersion stabilizer for suspension polymerization according to claim 1, wherein the carboxylic acid compound is an aromatic carboxylic acid having two or more carboxyl groups in the molecule.

17. The dispersion stabilizer for suspension polymerization according to claim 1, wherein the saponification degree of the polyvinyl alcohol polymer (B) is in the range from 10 mol % to less than 60 mol %.

18. The dispersion stabilizer for suspension polymerization according to claim 1, wherein the saponification degree of the polyvinyl alcohol polymer (B) is in the range from 20 mol % to 50 mol %.

\* \* \* \* \*